US008649261B2

United States Patent
Wang et al.

(10) Patent No.: US 8,649,261 B2
(45) Date of Patent: Feb. 11, 2014

(54) METHOD AND SYSTEM FOR BLOCKING PROTOCOL MESSAGES AT A SUB-RING CONTROL CHANNEL WITHOUT VIRTUAL CHANNEL

(75) Inventors: Bin Wang, Shenzhen (CN); Shaoyong Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 66 days.

(21) Appl. No.: 13/392,948

(22) PCT Filed: Dec. 24, 2009

(86) PCT No.: PCT/CN2009/076012
§ 371 (c)(1),
(2), (4) Date: Feb. 28, 2012

(87) PCT Pub. No.: WO2011/022917
PCT Pub. Date: Mar. 3, 2011

(65) Prior Publication Data
US 2012/0155246 A1    Jun. 21, 2012

(30) Foreign Application Priority Data
Aug. 28, 2009    (CN) .......................... 2009 1 0167599

(51) Int. Cl.
*H04L 12/43* (2006.01)
*H04L 12/54* (2013.01)
*G06F 11/00* (2006.01)

(52) U.S. Cl.
USPC ............................. 370/228; 370/404; 370/460

(58) Field of Classification Search
None
See application file for complete search history.

(56) References Cited

U.S. PATENT DOCUMENTS

| | | | |
|---|---|---|---|
| 2005/0207348 A1* | 9/2005 | Tsurumi et al. | 370/241 |
| 2006/0250969 A1* | 11/2006 | Florit et al. | 370/241 |
| 2008/0317061 A1* | 12/2008 | Dake | 370/452 |
| 2009/0147675 A1* | 6/2009 | Sekihata | 370/225 |
| 2011/0261681 A1* | 10/2011 | Wu | 370/223 |
| 2012/0130759 A1* | 5/2012 | Davenport et al. | 705/7.12 |

FOREIGN PATENT DOCUMENTS

| | | |
|---|---|---|
| CN | 1960310 A | 5/2007 |
| CN | 101075935 A | 11/2007 |
| CN | 100454880 C | 1/2009 |
| JP | 2002118580 A | 4/2002 |
| JP | 2003218894 A | 7/2003 |

OTHER PUBLICATIONS

ITU-T G.8032/Y.1344, Ethernet ring protection switching.
IETF RFC 3619, Extreme Networks' Ethernet Automatic Protection Switching(EAPS).

(Continued)

*Primary Examiner* — Chi Pham
*Assistant Examiner* — Soon-Dong D Hyun
(74) *Attorney, Agent, or Firm* — Ling Wu; Stephen Yang; Ling and Yang Intellectual Property

(57) ABSTRACT

The present invention provides a method for blocking a protocol message at a Sub-ring control channel without a virtual channel, for avoiding the problem that the Sub-ring is in a continuous refresh state all the time caused by the existing solution of the Sub-ring control channel without the virtual channel, and the method includes: blocking forwarding of relevant messages when a forced switch is initiated or a failure is detected.

7 Claims, 7 Drawing Sheets

(56) References Cited

OTHER PUBLICATIONS

ITU-T G.8032/Y.1344, Ethernet ring protection switching, Feb. 2012.

IETF RFC 3619, Extreme Networks' Ethernet Automatic Protection Switching(EAPS), Oct. 27, 2003.

International Search Report for PCT/CN2009/076012 dated May 19, 2010.

* cited by examiner

METHOD AND SYSTEM FOR BLOCKING PROTOCOL MESSAGES AT A SUB-RING CONTROL CHANNEL WITHOUT VIRTUAL CHANNEL

TECHNICAL FIELD

The present invention relates to data communication field, and particularly, to a method and system for blocking a protocol message at a Sub-ring control channel without a virtual channel.

BACKGROUND OF THE RELATED ART

With development of Ethernet network towards multi-service bearing direction, in particular, some of services have an increasing requirement for the reliability, real-time of the network, and Ethernet widely adopts ring networking so as to improve network reliability. Furthermore, in the ring protection method, it usually requires fast protection switching, reaching below 50 ms. At present, such fast protection switching technology includes RFC3619 of Internet Engineering Task Force (IETF) and G.8032 of International Telecommunications Union (ITU-T), etc.

With regard to the definition of a sub-ring, the standards being established in the international, such as G.8032 of ITU, considers that the sub-ring is an Ethernet ring connected with other rings or networks by interconnection nodes, the interconnection node is a common node belonging to two or more Ethernet rings simultaneously.

As shown in FIG. 1a for instance, the nodes from A to G on the Sub-ring1 are the nodes having Ethernet switching function, and Sub-ring1 accesses the network X by the interconnection nodes. User M is connected with the node B, and user N is connected with the node D. Communication is between the user M and the user N. There are two physical paths between the user M and the user N, that is, user N←→node D←→node C←→node B←→user M, and user N←→node D←→node E←→node F←→network X←→node G←→node A←→node B←→user M.

When the Sub-ring protection technology is applied, it generally defines a ring protection link and a control node, namely: in the case of Ethernet ring network without failure, the ring protection link is a link that blocks data messages and prevents the formation of data link on the Sub-ring, and switching between the main path and the protection path of the Sub-ring can be performed through operating this section of the ring protection link. The node with the ring protection link is referred to as the control node or the main node herein. As shown in FIG. 2a, the ring network comprises nodes G, A, B, C, D, E and F, and comprises links <G, A>, <A, B>, <B, C>, <C, D>, <D, E> and <E, F>. The node A is the control node, and straight link <A, B> directly connected with w port of the node A is a ring protection link.

When the links on the ring are intact, the control node blocks the data message forwarding function of the port connected with the ring protection link, and there is no loop generating in the network, which prevents "broadcast storm" caused by the network loop. As shown in FIG. 2a, the control node A blocks the protection data forwarding function of w port, and the communication path between the user M and the user N is Path1: user M←→node B←→node C←→node D←→user N.

When link failure occurs, the control node unblocks the data message forwarding function of the port connected with the ring protection link, thereby ensuring the connection of the services. As shown in FIG. 2b, the failure of the link <B, C> on the ring occurs, the control node A unblocks the data message forwarding function of the port w, and the new communication path between the user M and the user N is Path2: user M←→node B←→node A←→node G←→network X←→node F←→node E←→node D←→user N.

When the link switching of Sub-ring occurs, the nodes need to refresh the address forwarding table so as to prevent the data message from keeping forwarding along the wrong path, i.e. the link before the link switching. As shown in FIG. 2a, when the ring network has no failure, the communication path between the user M and the user N is the Path1: user M←→node B←→node C←→node D←→user N. When the failure of the link <B, C> on the ring occurs, and if the nodes on the ring do not refresh the address, the data messages of the user M and the user N still transmit along the original path, the message sent by the user M is discarded at the node B, and the message sent by the user N is discarded at the node C. Therefore, in order to ensure the ring network is after topological change, the nodes on the ring network should refresh the address forwarding table.

Presently, the solution of refreshing the address of ITU-T G.8032 is that: when the port of the node on the Sub-ring receives a address refreshment protocol message, <Node_ID, BPR> information is extracted; this port compares the <Node_ID, BPR> information in the message with the <Node_ID, BPR> information originally stored in this port; if they are not consistent, this port deletes the originally stored <Node_ID, BPR> and stores the new <Node_ID, BPR>, and at the same time, the node refreshes the address forwarding table. The NODE_ID is an identification number of the node, and the BPR is used to indicate which port that sends the protocol message is blocked.

The address refreshment message of the Sub-ring should be transmitted on the Sub-ring control channel. Presently, the Sub-ring control channel of ITU-T G.8032 has two configuration ways. One is a configuration way without virtual channel, i.e., the Sub-ring control channel is only configured within the Sub-ring, as shown in FIG. 3a. Another Sub-ring control channel configuration includes a part of the Sub-ring and virtual channel. The virtual channel is configured on the other network or other ring between the interconnection node, and the virtual channel is a Sub-ring control channel that provides transmission channel for the Sub-ring protocol message, as shown in FIG. 3b. In the present invention, we mainly describe a method for transmitting the protocol message on a Sub-ring control channel without virtual channel. Wherein, the other ring includes the other Sub-ring.

Currently, the provision of blocking the Sub-ring protocol message by the G.8032 is that: "in the case of no virtual channel, the Sub-ring control channel terminates at the interconnection nodes, and the node on the ring blocks the transmission of the protocol message of the Sub-ring control channel".

The above solution of the Sub-ring control channel transmitting the protocol message will encounter problems in the following scenario, which is described specifically as follows:

as shown in FIG. 4a, e port of the node C initiates a forced switch (FS), the node C refreshes the address forwarding table, and then outwardly sends an FS protocol message along the two ports on the Sub-ring periodically. After other nodes on the Sub-ring firstly receive the protocol message, they refresh respective address forwarding table, and the control node A also unblocks the forwarding function of data message of w port. In the FIG. 4b, a single-pass failure of the link <E, D> occurs, that is: the direction of E→D is unblocked and the direction of D→E is blocked; the node E blocks e port and outwardly sends an SF message. Since non-failure block point on the Sub-ring just blocks data and does not block the protocol message, nodes A, B and G alternately receive the FS and SF protocol messages sent by the node C and the node E. the <Node_ID, BPR> stored by the nodes A, B and G will refresh continuously along with the alternately receiving of the FS and SF protocol messages of nodes. In other words, the nodes A, B and G are in a continuous refresh state. The Sub-ring performance is greatly damaged, and is always in a broadcast storm.

SUMMARY OF THE INVENTION

The present invention provides a method for blocking a protocol message at a Sub-ring control channel without a virtual channel, for avoiding the problem that the Sub-ring is in a continuous refresh state all the time caused by the existing solution of the Sub-ring control channel without the virtual channel, and the method comprises: blocking forwarding of relevant messages when a forced switch is initiated or a failure is detected.

Wherein, the step of blocking the forwarding of the relevant messages when the forced switch is initiated or the failure is detected comprises: judging whether a port of a node located on a sub-ring initiates the forced switch; when the forced switch is initiated, the node blocking the forwarding of the relevant messages of the port; and when the forced switch is not initiated, judging whether the port detects a failure of an adjacent link occurring, and if the failure occurs, the node blocking the forwarding of the relevant messages of the port.

Wherein, the relevant messages are a protocol message and a data message.

Wherein, the failure is a single-pass failure.

Wherein, after the step of, when the failure occurs, the node blocking the forwarding of the relevant messages of the port, the method further comprises: refreshing an address forwarding table; and outwardly sending a signal failure message periodically.

Furthermore, the present invention further provides a system for blocking a protocol message at a Sub-ring control channel without a virtual channel, and the system comprises: a block module, which is adapted for blocking forwarding of relevant messages when a forced switch is initiated or a failure is detected.

Wherein, the system further comprises: a forced switch judgment module and a failure judgment module; wherein, the forced switch judgment module is adapted for judging whether a port of a node located on a sub-ring initiates the forced switch; and the failure judgment module is adapted for judging whether the port detects a failure of an adjacent link occurring.

Wherein, the relevant messages are a protocol message and a data message.

Wherein, the failure is a single-pass failure.

It, through analysis, can be seen that, the existing solution of the Sub-ring control channel without the virtual channel may cause the Sub-ring in a continuous refresh state all the time. Therefore, it is meaningful to design a new method for blocking the protocol message at the Sub-ring control channel so as to improve the Sub-ring performance and prevent the broadcast storm.

PREFERRED EMBODIMENTS OF THE PRESENT INVENTION

In order to make the purpose, technical scheme and advantages of the present invention more clear, the present invention will be further illustrated in detail in the following in combination with the accompanying drawings and embodiments. It should be understood that the described specific embodiments herein are only intended to explain the present invention, and are not intended to limit the present invention.

The core content of the present invention is that: when the Sub-ring is configured with a control channel without a virtual channel, and if the port of the node on the Sub-ring initiates an FS or have detected that a failure of adjacent link occurs, the port blocks the forwarding of the protocol message, otherwise, the port does not block the forwarding of any protocol message.

The implementation steps of the present invention are as follows.

Figure 1A:
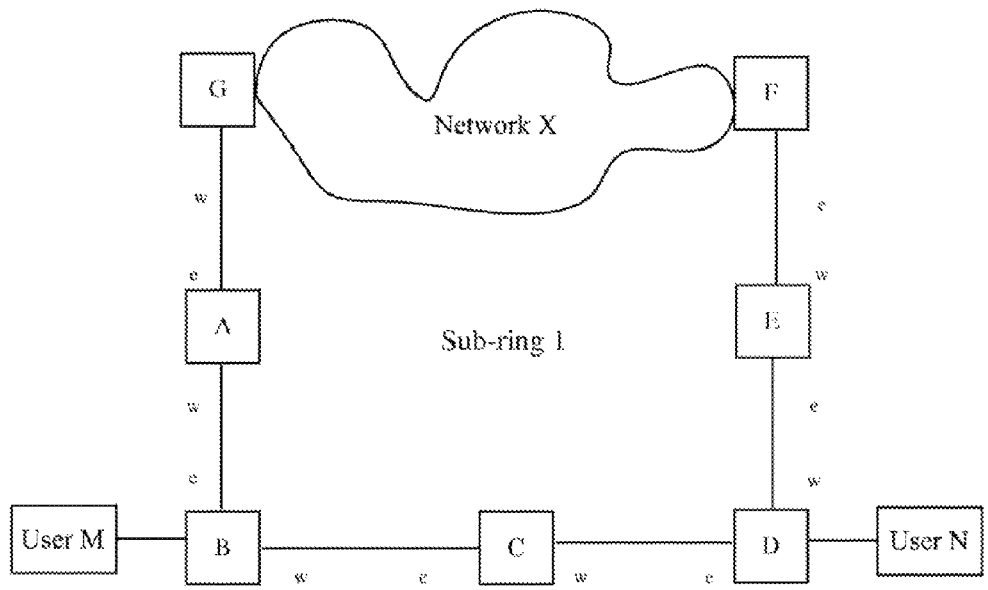
FIG. 1a is a structure diagram of a Sub-ring in the related art.
Figure 2A:
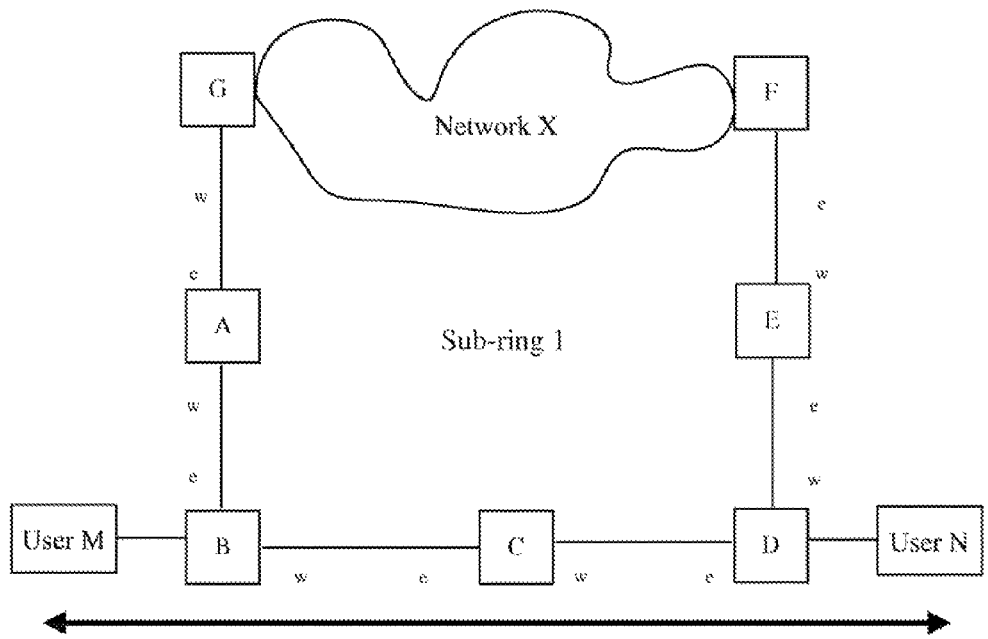
FIG. 2a is a schematic diagram of date forwarding in the case of a Sub-ring having no failure.
Figure 2B:
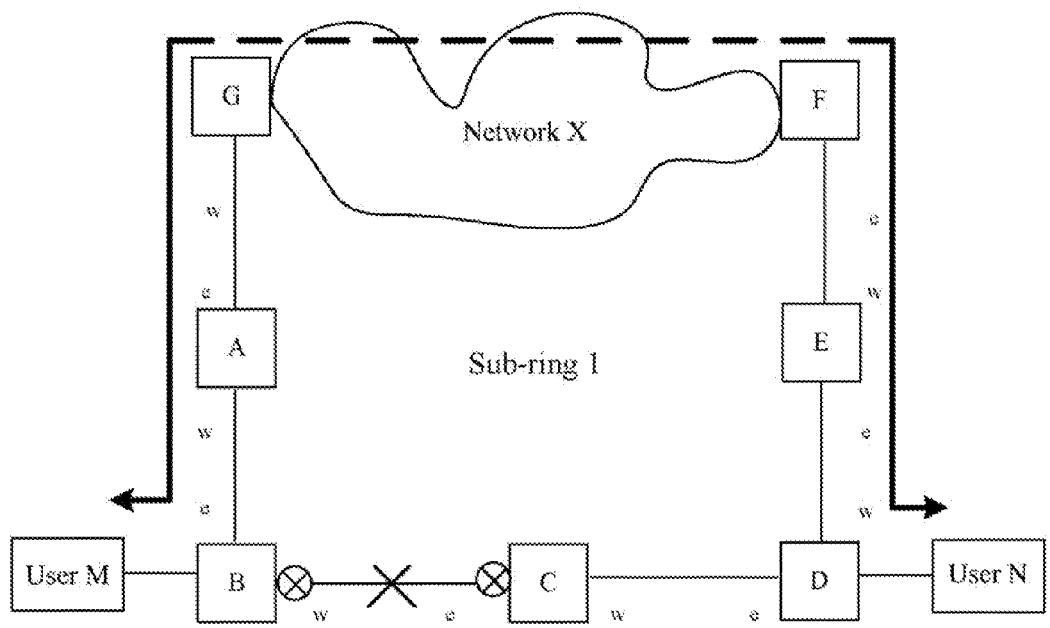
FIG. 2b is a schematic diagram of data flow protection switching in the case of a failure of a Sub-ring occurring.
Figure 3A:
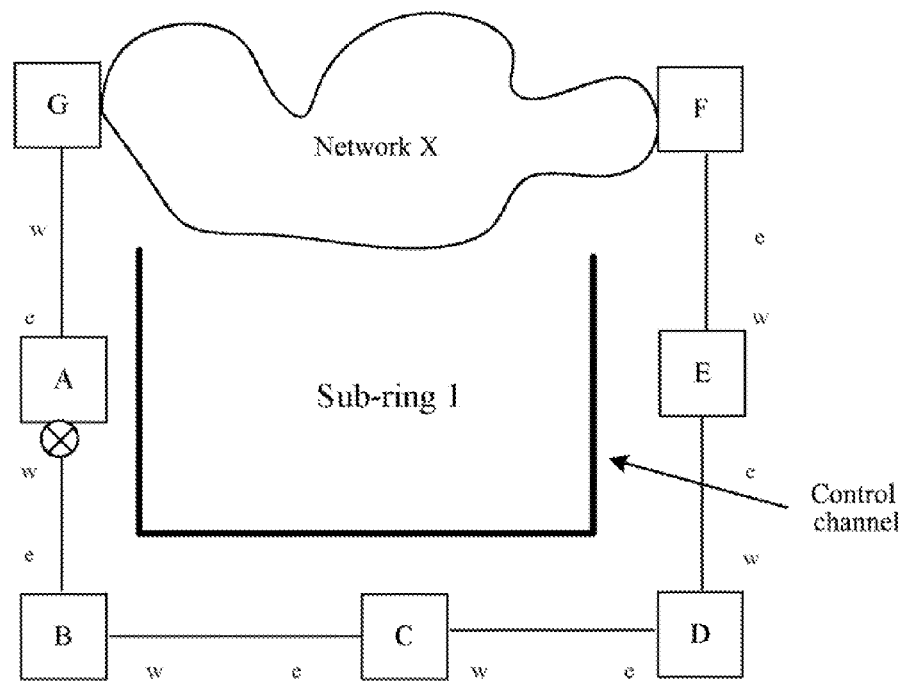
FIG. 3a and FIG. 3b are schematic diagrams of two kinds of control channels of a Sub-ring.
Figure 3B:
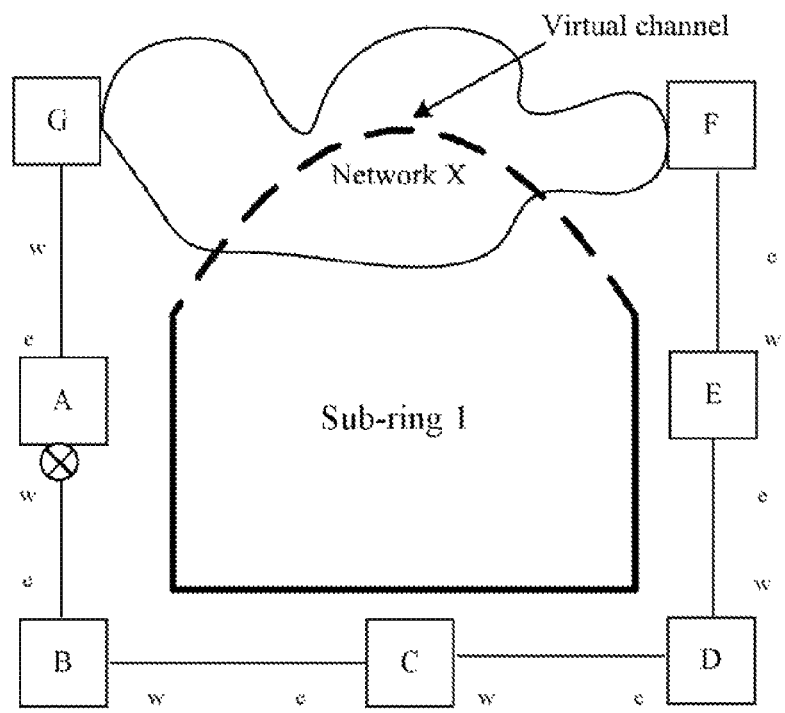
Figure 4A:
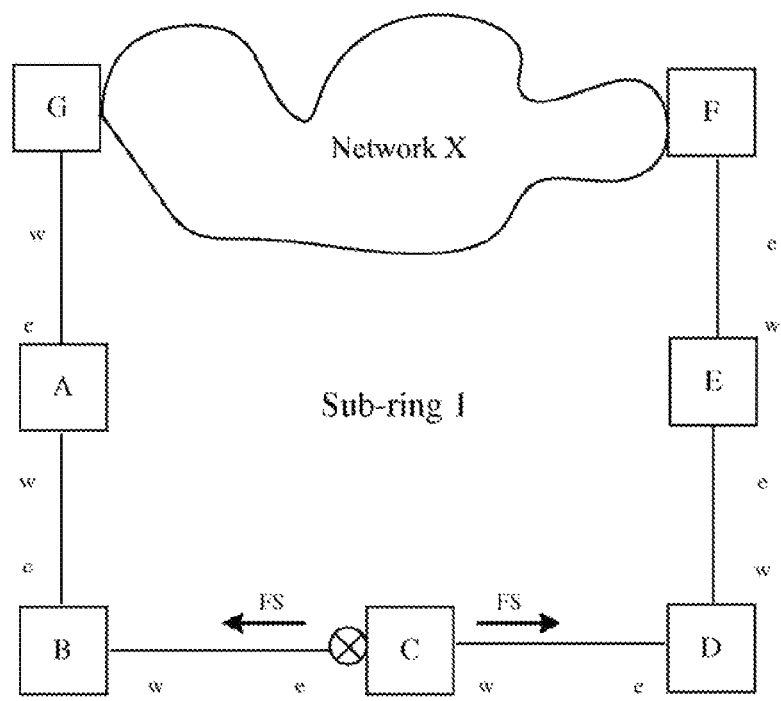
FIG. 4a and FIG. 4b are schematic diagrams of problems occurring in the related art.
Figure 4B:
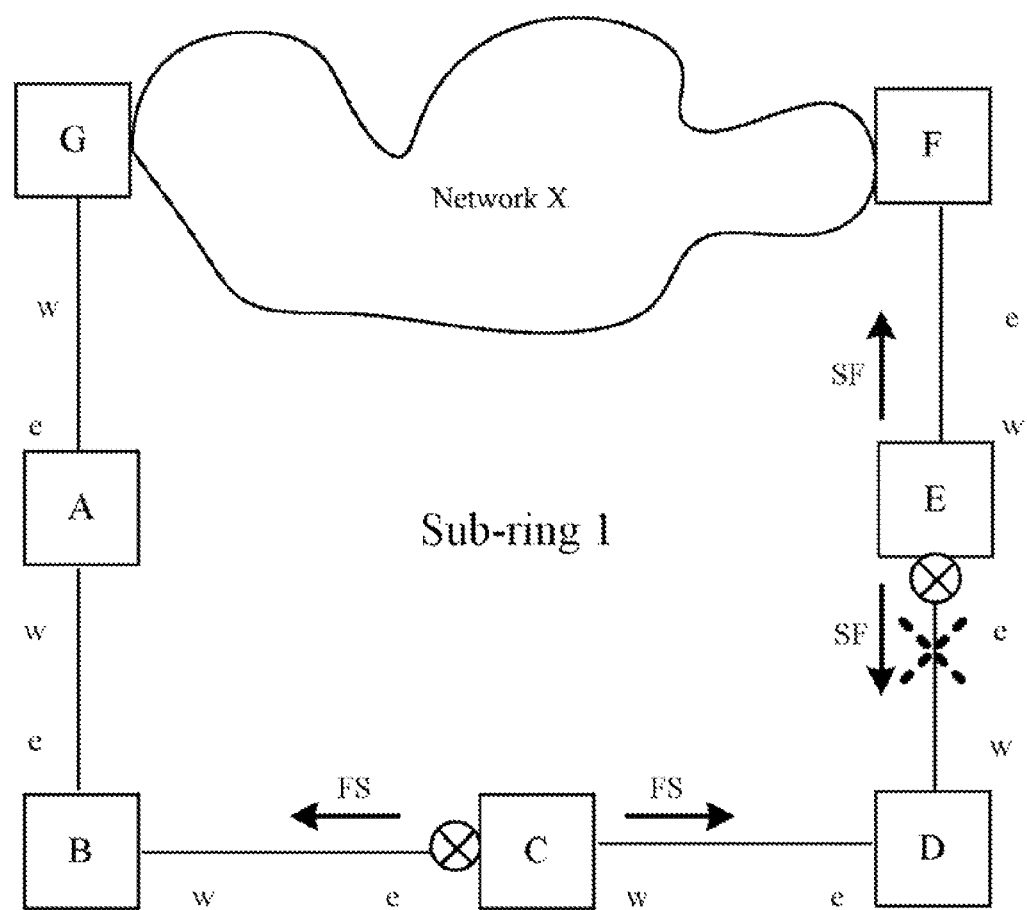
Figure 5A:
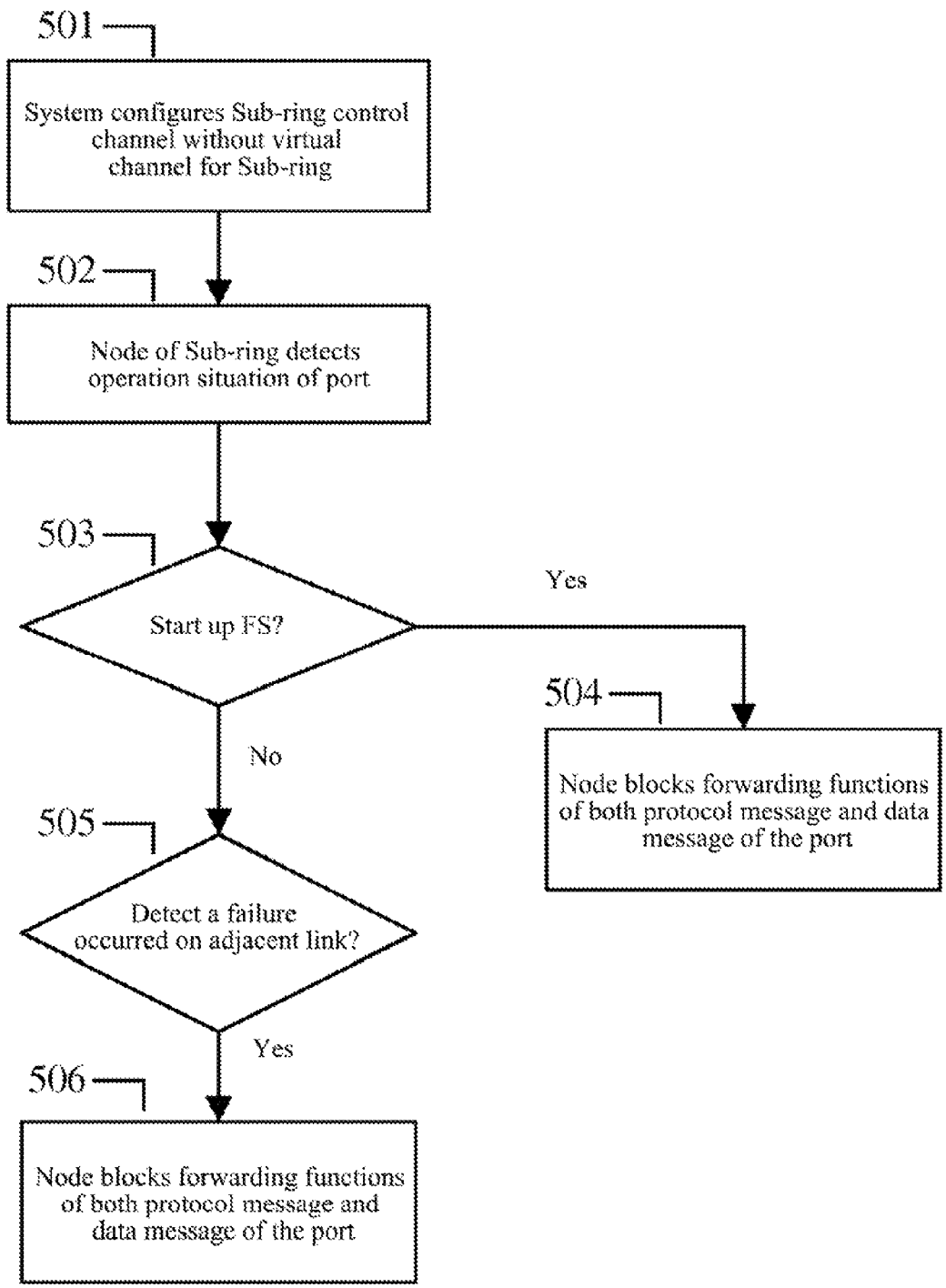
FIG. 5a is a specific flow chart of a method according to the present invention.

In order to further illustrate the technical scheme of the present invention, the steps of the present invention are interpreted as shown in FIG. 5a.

In step 501, the system configures a Sub-ring control channel without a virtual channel for the Sub-ring.

In step 502, a Sub-ring node detects the operation situation of ports.

In step 503, it is judged whether the port of the Sub-ring node initiates an FS, and if the FS is initiated, turn to step 504, otherwise, turn to step 505.

In step 504, the node blocks forwarding functions of both protocol message and data message of the port.

In step 505, it is judged whether the port has detected a failure of the adjacent link occurs, and if the failure occurs, turn to step 506.

In step 506, the node blocks the forwarding functions of both protocol message and data message of the port.

Specifically, we describe the specific implementation method according to the present invention through two examples but not limited to the two examples.

The example 1 is that: the Sub-ring appears the forced switch and the single-pass failure.

Figure 6A:
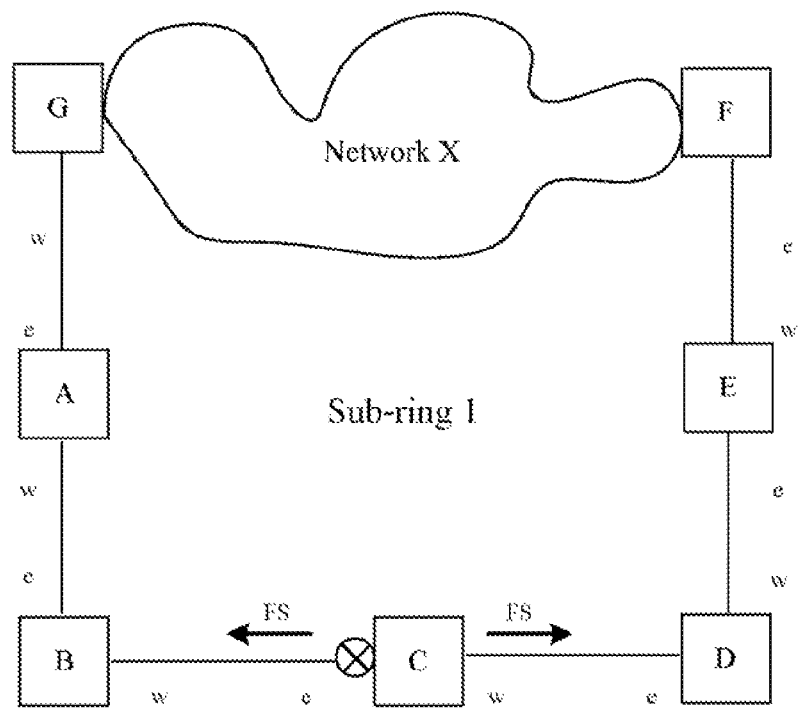
FIG. 6a and FIG. 6b are schematic diagrams of an example 1 according to the present invention.

As shown in FIG. 6a, the ring network comprises nodes A, B, C, D, E, F and G, and comprises links <G, A>, <A, B>, <B, C>, <C, D>, <D, E> and <E, F>. The node A is a control node, and the straight link <A, B> directly connected with w port of the node A is a ring protection link. The w port of the node A blocks the forwarding of the data message in a normal situation. Subsequently, e port of the node C initiates the FS, the node C blocks the forwarding function of both protocol message and data message of the e port, refreshes the address forwarding table, and then outwardly sends the FS protocol message along the two ports on the Sub-ring periodically.

After other nodes on the Sub-ring firstly receive the protocol message, other nodes refresh the respective address forwarding table, and the control node A also unblocks the forwarding function of data message of the w port.

Figure 6B:
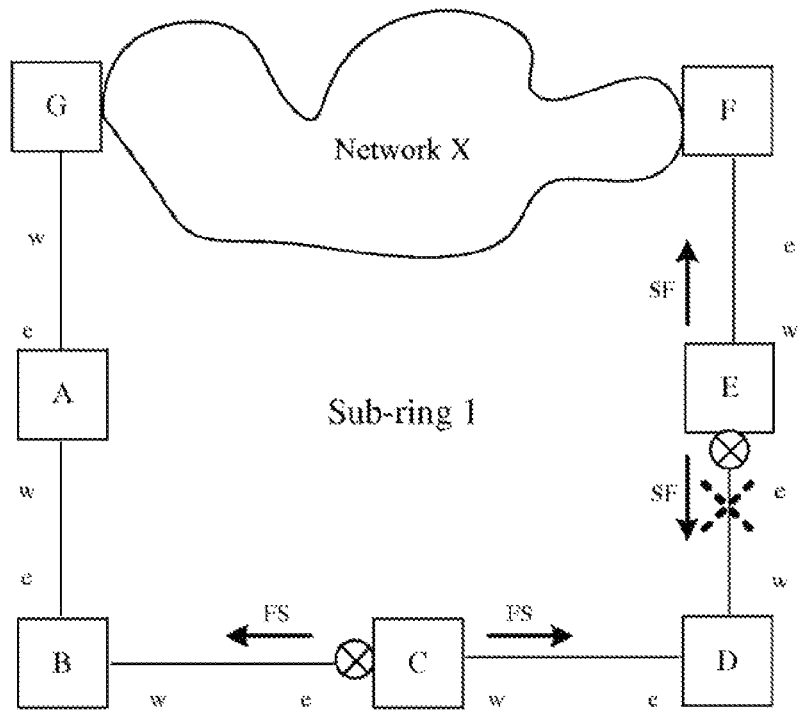

As shown in FIG. 6b, the single-pass failure of the link <E, D> occurs, that is: the direction of E→D is unblocked and the direction of D→E is blocked; the node E blocks the forwarding functions of both protocol message and data message of the e port, refreshes the address forwarding table, and outwardly sends an SF message periodically. After the nodes C, D and F firstly receive the SF message sent by the node E, they refresh the respective address forwarding table. Since the e port of the node C blocks both protocol message and data message, the nodes A, B and G will not appear the continuously refreshing phenomenon. Wherein, the e port at this time initiates the FS.

The example 2 is that: the Sub-ring appears a plurality of single-pass failures.

Figure 7A:
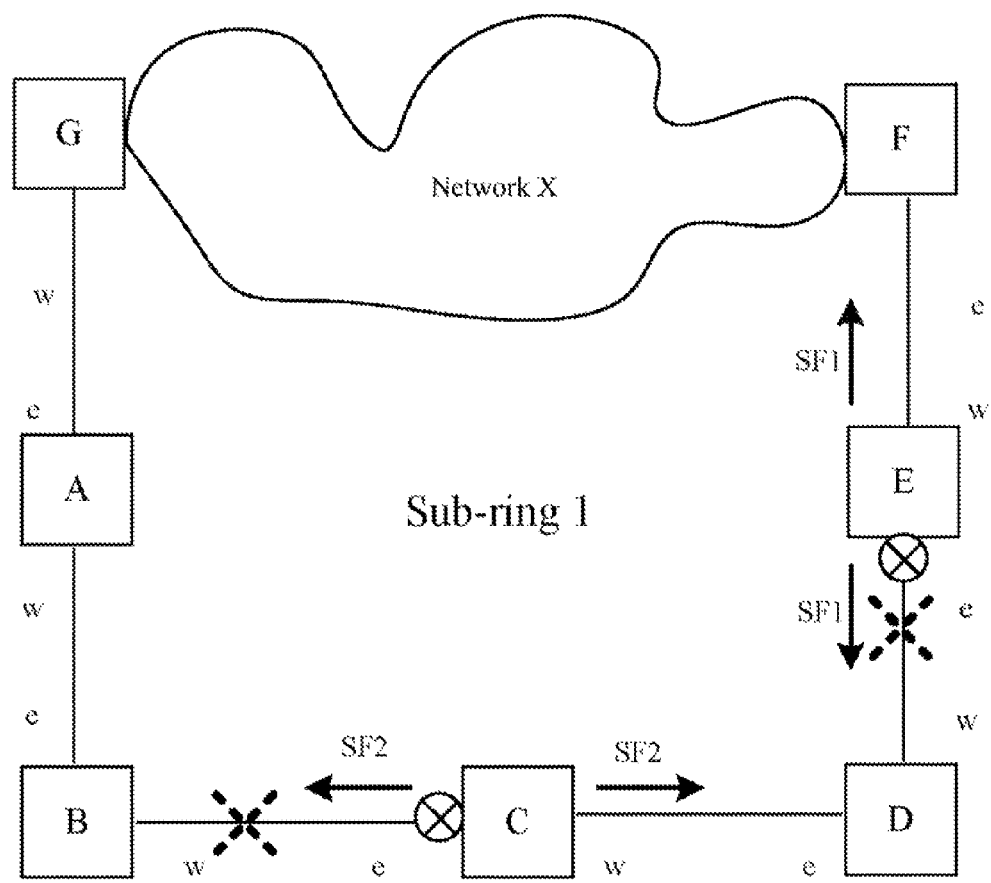
FIG. 7a is a schematic diagram of an example 2 according to the present invention.

As shown in FIG. 7a, the single-pass failure of the link <B, C> occurs firstly, that is: the direction of C→B is unblocked and the direction of B→C is blocked; after the node C detects the failure, it blocks the forwarding functions of both protocol message and data message of the e port, refreshes the address forwarding table, and outwardly sends an SF message periodically. After other nodes on the Sub-ring firstly receive the SF message sent by the node E, they refresh the respective address forwarding table. The control node A also unblocks the forwarding function of data message of the w port.

Then, the single-pass failure of the link <E, D> occurs, that is: the direction of E→D is unblocked and the direction of D→E is blocked; the node E blocks the forwarding functions of both protocol message and data message of the e port, refreshes the address forwarding table, and outwardly sends the SF message periodically. After the nodes C, D and F firstly receive the SF message sent by the node E, they refresh the respective address forwarding table. Since the e port of the node C blocks both protocol message and data message, the nodes A, B and G can not receive the SF message sent by the node E. As a result, the nodes A, B and G will not appear the continuously refreshing phenomenon. Wherein, at this time, the failure of the adjacent link of the e port occurs.

It, through analysis, can be seen that, the existing solution of the Sub-ring control channel without the virtual channel may cause the Sub-ring in a continuous refresh state all the time. Therefore, it is meaningful to design a new method for blocking the protocol message at the Sub-ring control channel so as to improve the Sub-ring performance and prevent the broadcast storm.

Here, the above-mentioned Sub-ring is expressed as Sub-Ring; the interconnection node is expressed as Interconnection Node; and the virtual channel is expressed as Virtual Channel.

The above description is only the preferred embodiments of the present invention and is not intended to limit the present invention; for those skilled in the art, the present invention can have various modifications and variations. Any of modifications, equivalents and improvements, and so on, made within the spirit and principle of the present invention, shall all fall into the protection scope of the prevent invention.

What is claimed is:

1. A method for blocking a protocol message at a Sub-ring control channel without a virtual channel, comprising:
when a port of a non-control node in a sub-ring initiates a forced switch, said non-control node blocking the port from forwarding protocol messages and data messages;
when a port of another non-control node in said sub-ring detects a single-pass link failure, the said another non-control node also blocking the port from forwarding protocol messages and data messages.

2. The method of claim 1, further comprising:
judging whether a port of a node located on the sub-ring initiates the forced switch;
when determining that the port of the non-control node initiates the forced switch, the non-control node blocking the port from forwarding the protocol messages and the data messages; and
when determining that the port of the non-control node does not initiate the forced switch, judging whether a port of another node detects a failure of an adjacent link, and if determining that the port of the said another non-control node detects the failure, the said another non-control node blocking the port from forwarding the protocol messages and the data messages.

3. The method of claim 2, wherein, after the step of the said another non-control node blocking the port from forwarding the protocol messages and the data messages, the method further comprises:
the said another non-control node refreshing an address forwarding table; and outwardly sending a signal failure message periodically.

4. The method of claim 1, wherein, when more than one port of any other non-control nodes in said sub-ring detect the single-pass link failure, the said non-control nodes blocking the ports, each of which corresponds to its own non-control node, from forwarding protocol messages and data messages.

5. A system for blocking a protocol message at a Sub-ring control channel without a virtual channel, comprising: a control node and multiple non-control nodes which compose a Sub-ring, wherein:
a non-control node is configured to, when a port of the non-control node initiates a forced switch, block the port from forwarding protocol messages and data messages; and
another non-control node is configured to, when a port of the said another non-control node detects a single-pass link failure, block the port from forwarding protocol messages and data messages.

6. The system of claim 5, wherein,
the non-control node comprises:
a forced switch judgment module for judging whether the port of the non-control node initiates the forced switch, and forming a first determining result;
a first blocking module for, when the first determining result is that the port of the non-control node initiates the forced switch, blocking the port from forwarding the protocol messages and the data messages;
the said another non-control node comprises:
a failure judgment module for judging whether the port of the said another non-control node detects a failure of an adjacent link, and forming a second determining result;
a second blocking module for, when the second determining result is that the port of the said another non-control node detects the failure, blocking the port from forwarding the protocol messages and the data messages.

7. The system of claim 5, wherein, when more than one port of any other non-control nodes in said sub-ring detect the single-pass link failure, the said non-control nodes are configured to, block the ports, each of which corresponds to its own non-control node, from forwarding the protocol messages and the data messages.

* * * * *